(12) United States Patent
Ganz et al.

(10) Patent No.: US 7,176,809 B2
(45) Date of Patent: Feb. 13, 2007

(54) ENVIRONMENTAL DATA RECORDER FOR MICRO-WELL PLATE

(75) Inventors: Brian L. Ganz, Carlsbad, CA (US); John A. Adams, Escondido, CA (US); Joseph Gottlieb, Escondido, CA (US); John Andrew Moulds, Encinitas, CA (US); Jason Kovach, Oceanside, CA (US)

(73) Assignee: Robo Design International, Inc., Carlsbad, CA (US)

( * ) Notice: Subject to any disclaimer, the term of this patent is extended or adjusted under 35 U.S.C. 154(b) by 498 days.

(21) Appl. No.: 10/769,537

(22) Filed: Jan. 30, 2004

(65) Prior Publication Data

US 2005/0179562 A1  Aug. 18, 2005

(51) Int. Cl.
*H04Q 9/00* (2006.01)
*G08C 19/22* (2006.01)
*B65B 43/42* (2006.01)
*B67C 3/00* (2006.01)
*G08C 19/06* (2006.01)
*C12M 1/00* (2006.01)
*C12M 1/40* (2006.01)
*G01N 31/00* (2006.01)
*B65D 85/00* (2006.01)
*B65D 85/30* (2006.01)

(52) U.S. Cl. ................. 340/870.07; 141/129; 141/130; 141/131; 340/870.06; 340/870.08; 204/403.01; 206/725

(58) Field of Classification Search ........... 340/870.07, 340/870.06, 870.08; 141/130, 129, 131; 204/403.01; 206/725; 435/4, 286.2; 424/93.2, 424/155.1; 436/166; 525/234; 73/864.14
See application file for complete search history.

(56) References Cited

U.S. PATENT DOCUMENTS

| | | | |
|---|---|---|---|
| 2002/0068358 A1* | 6/2002 | Campbell et al. | 435/289.1 |
| 2002/0072784 A1* | 6/2002 | Sheppard et al. | 607/60 |
| 2003/0063585 A1* | 4/2003 | Younis et al. | 370/331 |
| 2003/0129755 A1* | 7/2003 | Sadler et al. | 436/43 |

* cited by examiner

*Primary Examiner*—Jeffery Hofsass
*Assistant Examiner*—Sisay Yacob
(74) *Attorney, Agent, or Firm*—John R. Ross; John R. Ross, III

(57) ABSTRACT

An environmental data recorder for recording environmental factors acting on micro-well plates. The environmental data recorder has sensors for sensing environmental factors and it has a microcontroller programmed to receive and process inputs from the sensors. The sensors and microcontroller are housed in a recorder housing unit. The recording housing unit has exterior dimensions that are approximately equal to the exterior dimensions of the micro-well plates enabling the recorder housing unit to be handled by the same robotic device handling the micro-well plates. In a preferred embodiment, the environmental data recorder's sensors are a temperature sensor, a humidity sensor and an accelerometer.

33 Claims, 10 Drawing Sheets

ENVIRONMENTAL DATA RECORDER FOR MICRO-WELL PLATE

The present invention relates environmental recording devices, and in particular, environmental recording devices for micro-well plates.

BACKGROUND OF THE INVENTION

The determination of the three dimensional atomic structure of matter is one of the most important areas of pure and applied research. The three dimensional atomic structure of matter can be determined is through X-ray crystallography. X-ray crystallography utilizes the diffraction of X-rays from crystals in order to determine the precise arrangement of atoms within the crystal. The result may reveal the atomic structure of substances such as deoxyribonucleic acid (DNA) or proteins.

Protein Crystals can be Grown in Micro-Well Plates

Protein crystals can be grown in the wells of micro-well plates. Also known as a micro-titer plate or a microplate, micro-well plates typically comprise 24, 48, 96, 384 or 1536 wells. FIG. 1 shows a prior art 96-well micro-well plate 100. Prior art micro-well plate 100 has been manufactured to be in conformity with the industry standard (SBS) height, width and length dimensions. The industry standard is set by the Society of Biomolecular Screening and is referred to as SBS. For example, micro-well plate 100 is made in accordance with SBS standards and has a height of approximately 15.8 mm, a width of approximately 86.7 mm, and a length of approximately 127.7 mm.

There are many factors that can potentially effect the successful growth of a protein crystal. Protein crystal growth is a function of the nucleation from a super-saturated solution. Nucleation can be effected by environmental conditions, such as changes in temperature, humidity, and vibration or shock. It is extremely important that all environmental conditions that may effect the protein crystal growth are known.

Research facilities regularly monitor and control the temperature of the room in which the protein material in the micro-well plates are incubated. Sometimes the humidity is also measured. Vibration sensors may be placed on static shelves with the micro-well plates to record the vibration that the plate undergoes. Prior art vibration sensors are typically not moved, but rather remain stationary on the shelf to measure vibration during the growth of the protein crystal

Robotic Handling of Micro-Well Plates

It is very common for medium to large laboratories to use robotic devices to automatically handle micro-well plates. During the robotic handling of the micro-well plate, the micro-well plate will most likely be subject to some degree of vibration or shock. As explained above, vibration or shock could very easily effect the successful growth of protein crystals in the wells of the micro-well plate.

What is needed is a better device for recording environmental factors acting on micro-well plates.

SUMMARY OF THE INVENTION

The present invention provides an environmental data recorder for recording environmental factors acting on micro-well plates. The environmental data recorder has sensors for sensing environmental factors and it has a microcontroller programmed to receive and process inputs from the sensors. The sensors and microcontroller are housed in a recorder housing unit. The recorder housing unit has exterior dimensions that are approximately equal to the exterior dimensions of the micro-well plates enabling the recorder housing unit to be handled by the same robotic device handling the micro-well plates. In a preferred embodiment, the environmental data recorder's sensors are a temperature sensor, a humidity sensor and an accelerometer.

DETAILED DISCUSSION OF A PREFERRED EMBODIMENT

Figure 1:
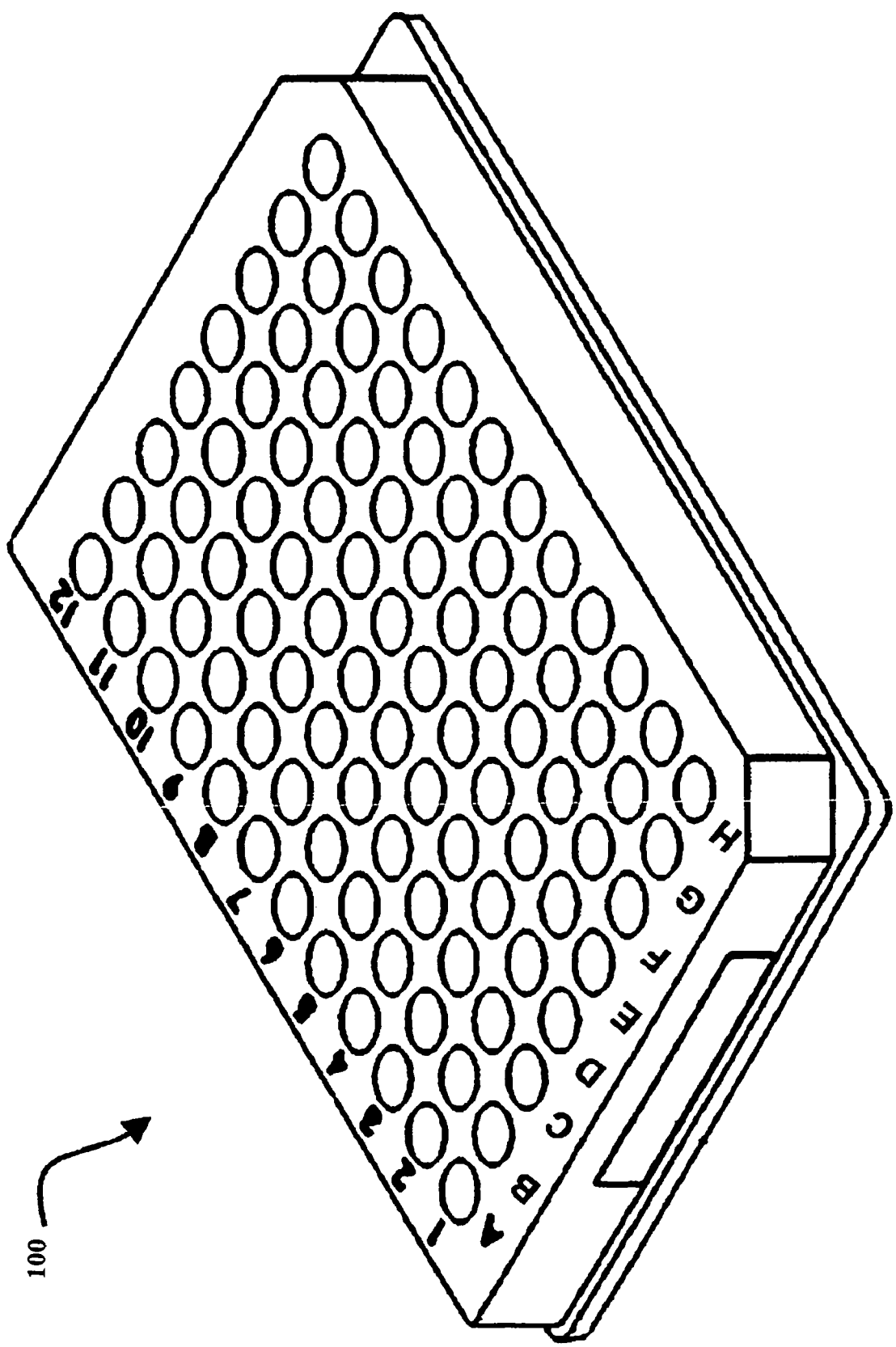
FIG. 1 is an illustration of a prior art micro-well plate.

A detailed description of a preferred embodiment of the present invention can be described by reference to FIGS. 2–12. In the present invention, data logger 200 (FIG. 2) has approximately the same SBS dimensions as prior art micro-well plate 100 (FIG. 1). Data logger 200 is in preferred embodiments robotically handled along with a batch of micro-well plates 100 as if data logger 200 itself was also a micro-well plate. In the preferred embodiment, data logger 200 preferably comprises sensors that allow it to record values for vibration, temperature and humidity. By observing the values for vibration, temperature and humidity measured and recorded by data logger 200, one can conclude the values for vibration, temperature and humidity experienced by the micro-well plates in the batch of plates being robotically handled in a fashion similar to data logger 200.

Figure 2:
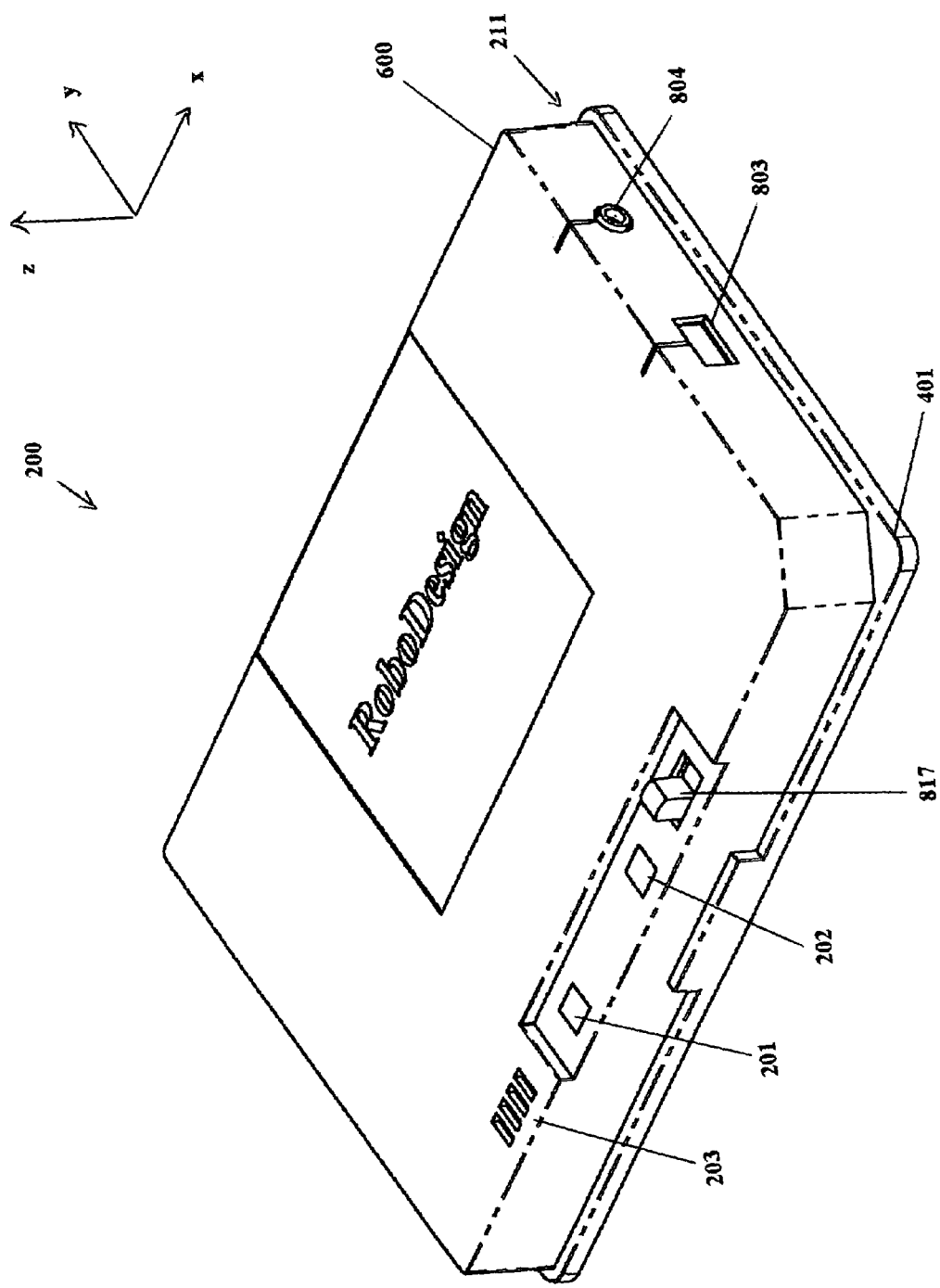
FIG. 2 is a perspective view of a preferred data logger.
Figure 4:
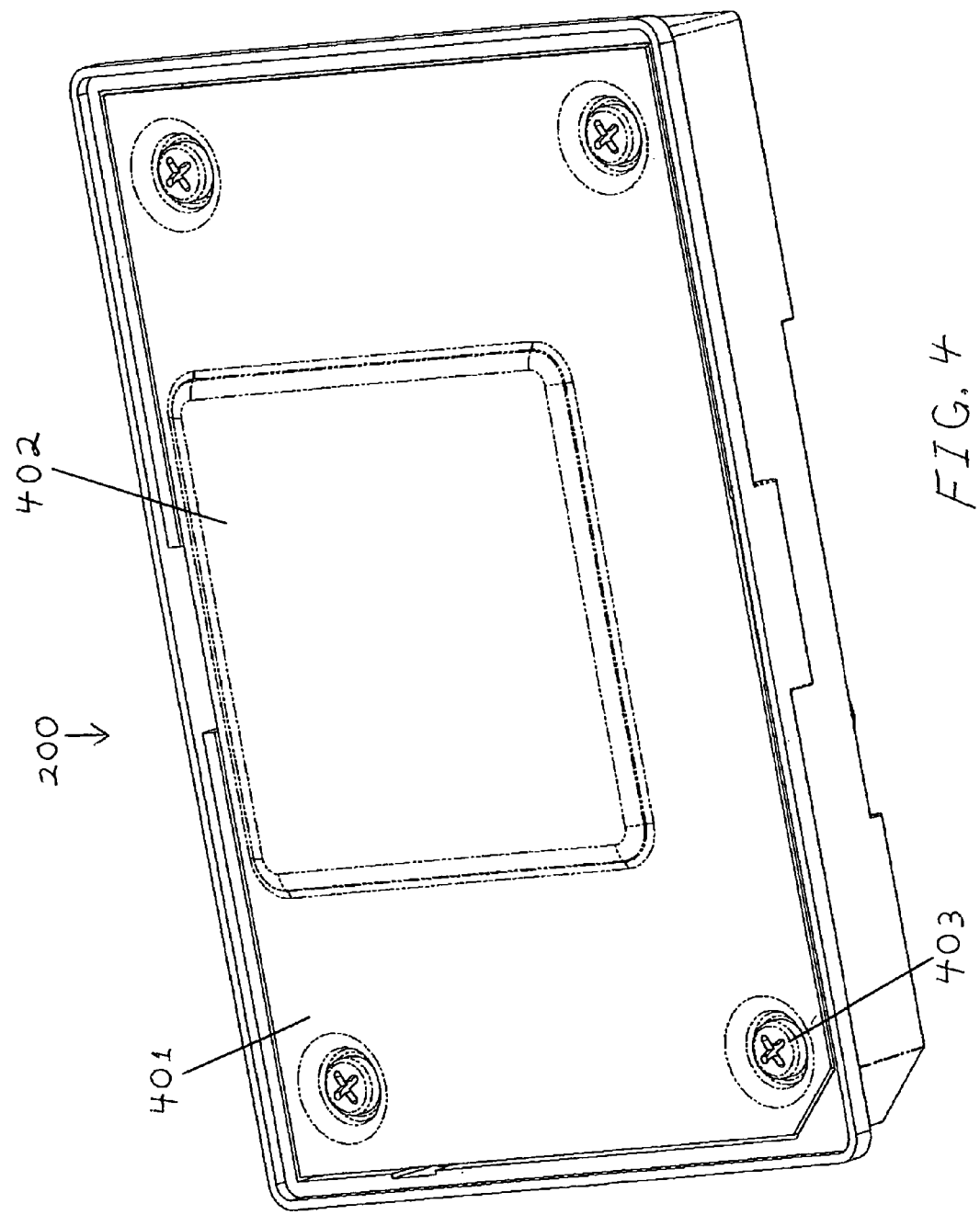
FIG. 4 is another perspective view of the data logger.
Figure 8:
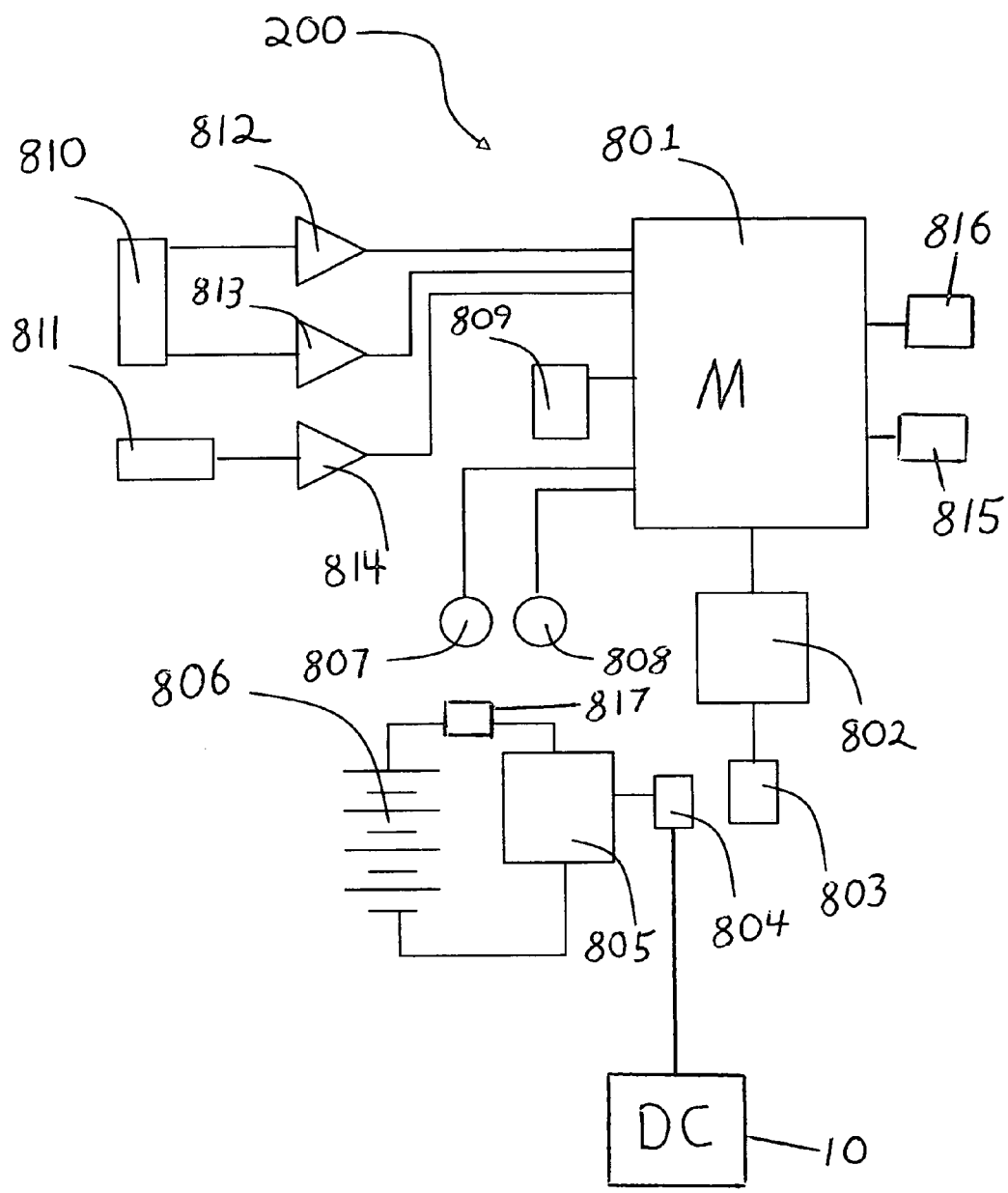
FIG. 8 is a block diagram showing the major electronic components in the data logger.

As shown in FIG. 2, data logger housing unit 211 is formed by joining together top cover 600 and bottom cover plate 401. Also shown in FIG. 2 are status lights 201 and 202, on/off switch 817, connector 803 for a USB interface, and a second connector 804 for connecting a direct current (DC) line to the battery charging circuits. Grill 203 allows air to flow freely to humidity/temperature sensor 809 (FIG. 8). FIG. 4 shows a bottom perspective view of data logger 200 and mounting fasteners 403. Bottom cover plate 401 has formed relief 402.

Figure 5:
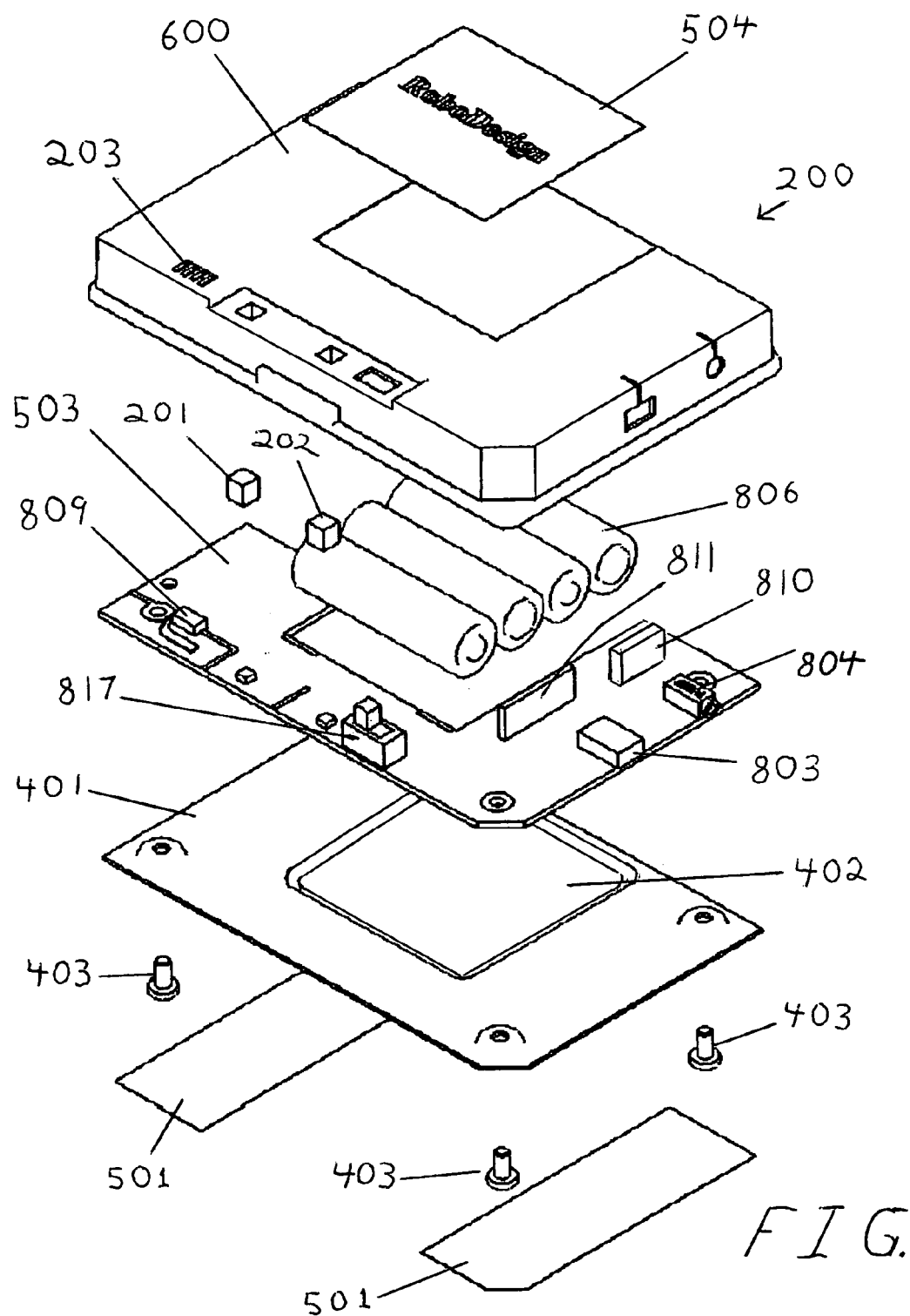
FIG. 5 is an exploded perspective view of the data logger.

FIG. 5 shows an exploded perspective view of the data logger 200. Manufacturer label 504 attaches to the top of top cover 600. Fasteners 403 connect top cover 600, electronics circuit board 503, and bottom cover plate 401. Several components are mounted to electronics circuit board 503, such as: as humidity/temperature sensor 809, on/off switch 817, z-axis (vertical motion) accelerometer 811, x-axis and y-axis (horizontal motion) accelerometer 810, DC connector 804, universal serial bus (USB) connector 803, and status lights 201 and 202. Battery pack 806 rests on formed relief 402 of bottom cover plate 401. Bottom labels 501 cover fasteners 403.

Figure 6:
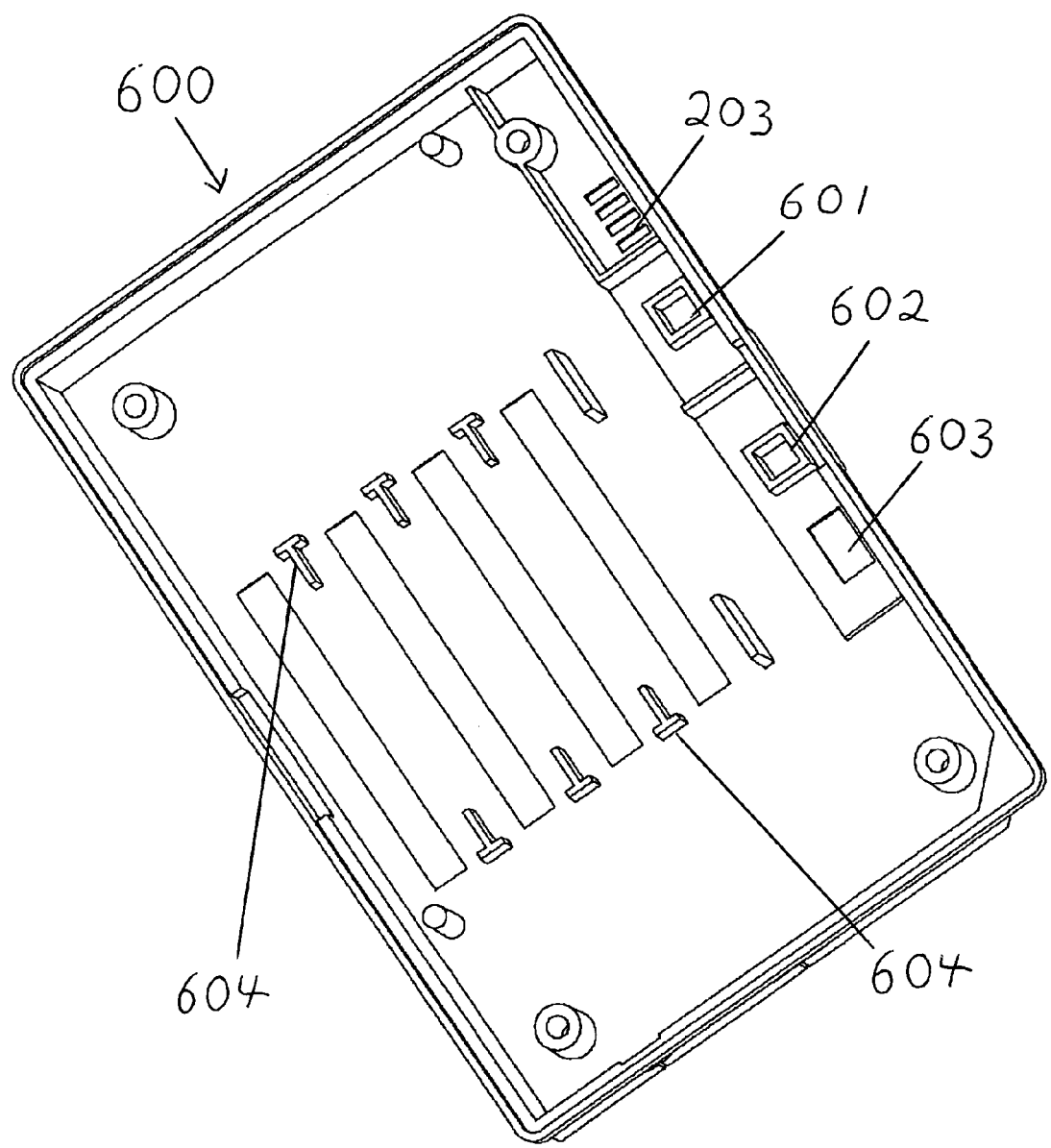
FIG. 6 is perspective view of the underside of the top housing of the data logger.

FIG. 6 shows the underside of top cover 600. Grill 203 allows air to flow to humidity/temperature sensor 809. Openings 601 and 602 are for status lights 201 and 202 (FIG. 2), respectively. Openings 603 are for on/off switch 817 (FIG. 5). Locating features 604 allow battery pack 806 to be accurately located as shown in FIG. 5.

Figure 7:
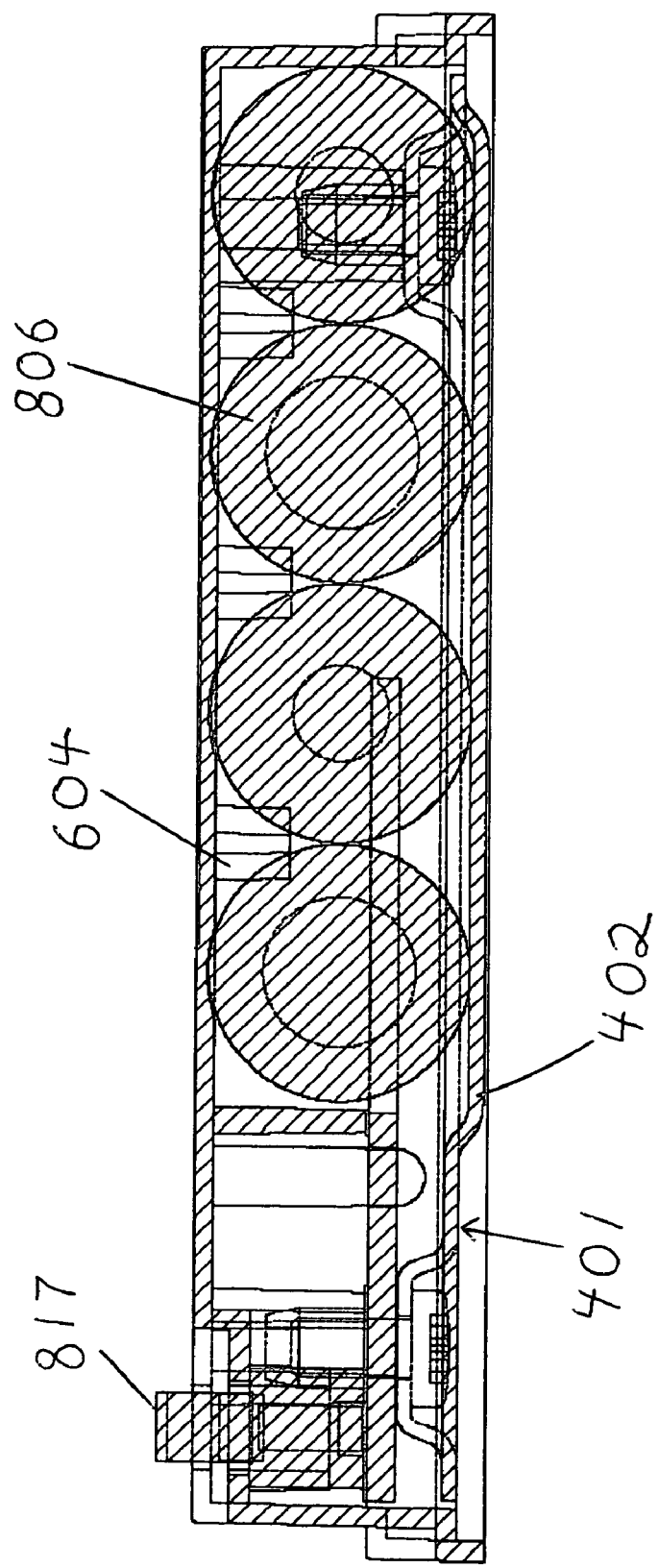
FIG. 7 is a cross-section view of the assembled data logger showing the nest for the batteries.

FIG. 7 shows a cross-section side view of battery pack 806 showing how the locating features 604 and formed relief 402 in bottom plate 401 effectively capture battery pack 806. Switch 817 is shown for reference.

FIG. 8 shows the major electronic elements in data logger 200. Micro-controller 801 is available from the Atmel Corporation in San Jose, Calif. and is Atmel part no. ATMEGA128. Micro-controller 801 has built in analog to digital circuitry, built in input/output circuitry, and a built in serial communications controller. Micro-controller 801 interfaces with a pre-programmed electrically erasable and programmable read only memory (EEPROM) 816. Micro-controller 801 contains control instructions and sensor drivers for all sensors plus data storage for storing data from each sensor. Micro-controller 801 accepts inputs from real-time clock 815, humidity/temperature sensor 809, and analog signal conditioning bandpass filters 812, 813, and 814. Micro-controller 801 also accepts inputs from x and y-axis accelerometer 810, and z-axis accelerometer 811. Micro-controller 801 interfaces with the status lights 807 and 808 and USB controller chip 802.

Battery Pack

Battery Pack 806 provides all power to micro-controller 801. Power is switched on/off with switch 817. Battery pack 806 may be charged with a DC power source through charging circuit 805. DC power source 10 is connected to charging circuit 805 via connector 804.

Accelerometers

The x and y-axis accelerometer 810 and z-axis accelerometer 811 transmit values for acceleration to micro-controller 801. Micro-controller 801 is then programmed to calculate in $cm/s^2$ values for vibration that data logger 200 may have been subject to. In one preferred embodiment, accelerometers 810 and 811 are each part no. ADXL311, available from Analog Devices of Norwood, Mass.

Modes of Operation

Data logger 200 has three preferred modes of operation: "timed", "event driven", and "continuous".

Timed Mode

In the "timed" mode, data logger 200 samples accelerometers 810 and 811 continuously at a sample rate of approximately 5 kHz. Micro-controller 801 then calculates the vibration and keeps the value for each axis if the value is larger than what has been previously kept during the interval. When the programmed time interval is completed, micro-controller 801 reads the value of humidity/temperature sensor 809 and writes to EEPROM the maximum vibration values of the x, y, z axis during the programmed time interval. It also writes to EEPROM the temperature, the humidity, the data and time at the end of the programmed time interval. If, for example, the time interval is set to 10 seconds, then during the 10 seconds, micro-controller 801 will record the maximum vibration for each axis. When the 10 seconds is over, micro-controller 801 then reads inputs from humidity/temperature sensor 809 and records the temperature and humidity values at the end of the 10 second interval. The maximum vibration values are then re-set and the process begins again until data logger 200 is connected to an external computing device through the USB port and the command is given to either stop the timed reading or the command is given to dump out the stored readings. The "timed" mode of data logger 200 is useful for determining the maximum vibration that the plate has experienced during each time interval.

Event Driven Mode

In this mode, data logger 200 samples accelerometers 810 and 811 continuously at a sample rate of approximately 5 kHz. Micro-controller 801 calculates the vibration for each axis and compares the value to a programmed threshold for each axis. If the value is greater than the threshold value for any axis, then micro-controller 801 reads the value of the humidity/temperature sensor and writes to EEPROM the vibration values of the x, y, z axis, the temperature, the humidity, the data and time. The "event driven" mode is useful for knowing when and to what degree data logger 200 went beyond threshold limits.

Continuous Mode

In this mode, data logger 200 samples accelerometers 810 and 811 continuously at a sample rate of approximately 5 kHz. Micro-controller 801 calculates the vibration for each axis and then sends the vibration data to an external computing device connected to data logger 200 via USB communication port 803. In the preferred embodiment, the temperature and humidity are not automatically read, but can be read upon command. The "continuous" mode is useful for allowing for continuous monitoring of data logger 200 via an external computing device.

Commands

Micro-controller 801 accepts commands from external devices over USB port 803. Preferred commands are listed in Table 1.

TABLE 1

| Command | Description | Reference Note |
|---|---|---|
| ga | Automatically Calculates static background levels | Generally First Command given |
| gd | Dump Data to the USB device | |
| gt | Get the time and date to the USB device | |
| gp | Get the temperature to the USB device | |
| gh | Get the humidity to the USB device | |

TABLE 1-continued

| Command | Description | Reference Note |
|---|---|---|
| gx | Dump all eeprom data | Useful after battery failure |
| sx v | Set the x threshold - v is the value | |
| sy v | Set the y threshold - v is the value | |
| sz v | Set the z threshold - v is the value | |
| sm | Set the background levels to values in ga | |
| th v | Sets the hour - 2 digits - military time | |
| tm v | Sets the minutes - 2 digits | |
| ts v | Sets the seconds - 2 digits | |
| tt v | Sets the time interval in seconds for the Timed mode | Value 0 stops the time mode, any other value starts it |
| dy v | Sets the year - 2 digits | |
| dm v | Sets the month - 2 digits | |
| dd v | Sets the day - 2 digits | |
| dr v | Sets the raw mode and selects which | |

UTILIZATIONS OF THE PRESENT INVENTION

There are a variety of usages for data logger 200. Some of these usages are summarized below.

UTILIZATION DURING TRANSPORT BETWEEN LOCATIONS

Figure 10:
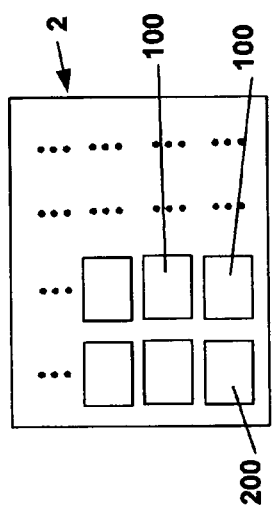
FIG. 10 shows a preferred data logger in a carrying case along with micro-well plates.

FIG. 10 shows data logger 200 inside carrying case 2 along with plurality of micro-well plates 100. As carrying case 2 is transported between locations, data logger 200 will record vibration values and temperature and humidity changes that occur. This information can then be used to analyze and/or accurately re-create conditions experienced by micro-well plates 100.

Utilization During Handling

Figure 11:
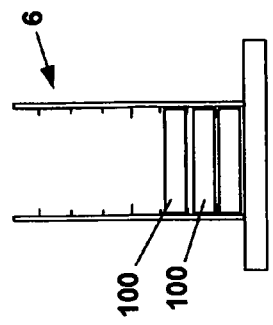
FIG. 11 shows a robotic device handling a preferred data logger.
Figure 11:
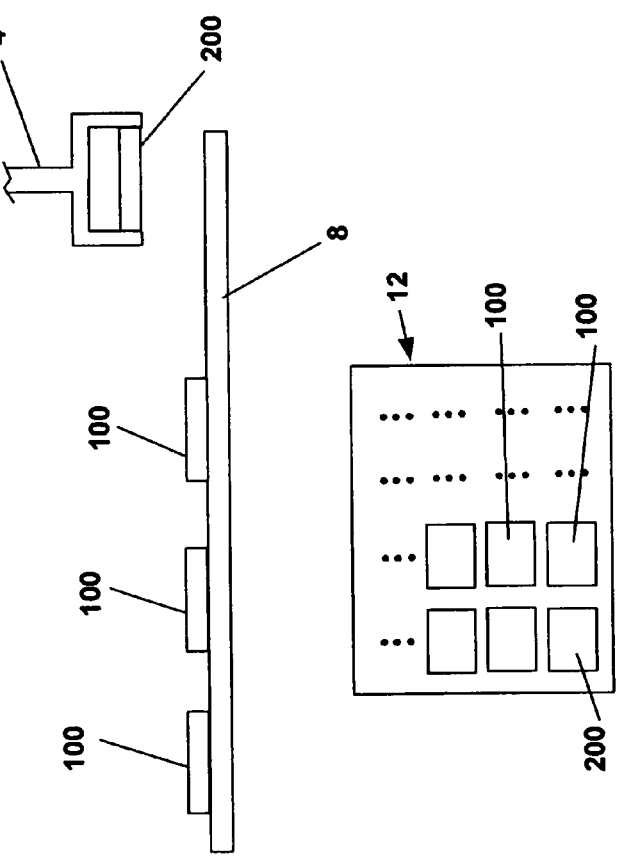

FIG. 11 shows robotic arm 4 moving micro-well plates 100 from platform 8 to storage rack 6. As micro-well plates 100 are moved, protein crystals growing inside the wells will be subject to vibration due to the manipulation of robotic arm 4. As shown in FIG. 11, data logger 200 is also subject to the same manipulation as it is moved from platform 8 to storage rack 6. As data logger 200 is moved by robotic arm 4, it will be subject to approximately the same vibration values experienced by micro-well plates 100. Data logger 200 will record the vibration values for later analysis.

Utilization During Incubation

Figure 12:
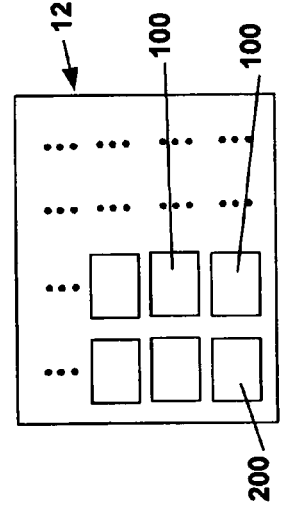
FIG. 12 shows a preferred data logger in a carrying case along with micro-well plates.

FIG. 12 shows data logger 200 inside incubator 12 along with micro-well plates 100. While protein crystals are growing inside the wells in micro-well plates 100, it is important to properly control the humidity and temperature inside the incubator to ensure optimum opportunity for protein growth. Data logger 200 will record the temperature and humidity values. The data will be saved to verify that the appropriate temperature and humidity values were maintained. Or, if there were fluctuations, data logger 200 will record the fluctuations for later analysis.

Test of Prototype

To verify functionality of the present invention, Applicants built and tested a prototype. In this test a data logger similar to data logger 200 was set in the "timed" mode, at intervals of 30 seconds. The test was designed to transport the data logger between locations and record vibration, temperature and humidity variations.

In this test, at approximately 10:25 the data logger started in an office building. At approximately 10:33, the data logger was then transported by hand outside to the parking lot. Approximately a minute or two later it was then it was taken back into the office building because one of the Applicants forgot his car keys. Then, after having located his keys, Applicant then took the data logger back outside to his car and placed it on his car seat. Then at approximately 10:36, Applicant started to drive the data logger to a remote location. At approximately 11:00, the Applicant arrived at the remote location and left the data logger on his car seat inside the locked car until approximately 11:40. Then, shortly after approximately 11:40, Applicant drove the data logger back to the parking lot at the original office. At approximately 12:10 Applicant moved the data logger back into the original office building.

Figure 9A:
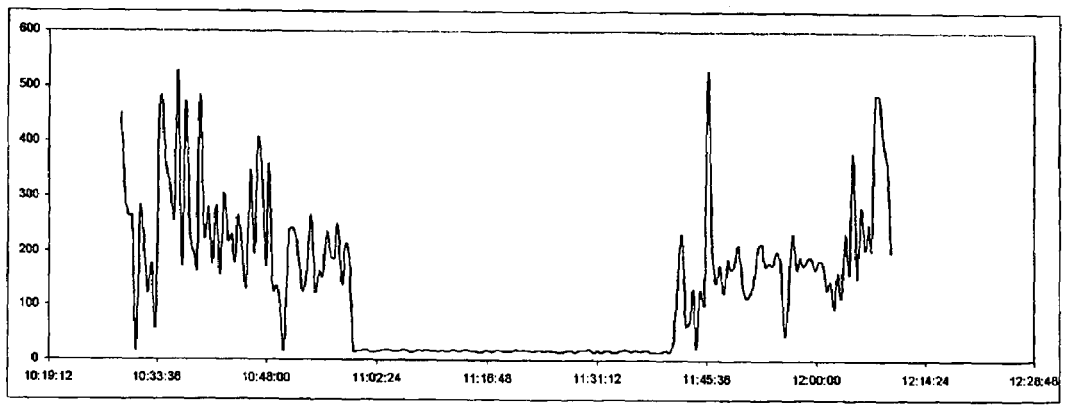
FIGS. 9A–9C show a data plot output from a preferred data logger for vibration, temperature and humidity.
Figure 9B:
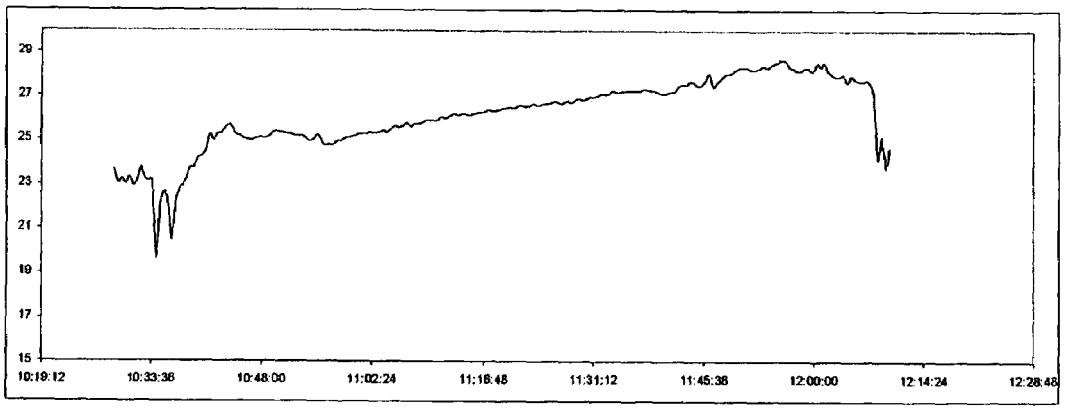
Figure 9C:
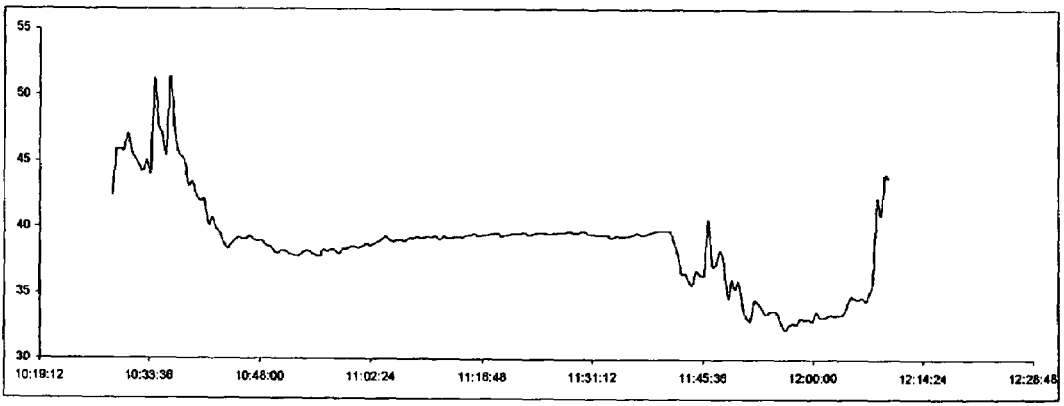

FIG. 9A shows data logger x-axis vibration in cm/s$^2$ vs. time. FIG. 9B shows data logger temperature in degrees Celsius vs. time, and FIG. 9C shows relative humidity in percent vs. time. Close examination of the plots shows that leaving the office building, returning for keys and going out again appears as two spikes in the humidity plot (FIG. 9C) corresponding to two drops in temperature (FIG. 9B) as it was a relative cool humid day. The wait in the parking lot where the data logger sat unmoved on Applicant's car seat is clearly shown in the vibration x-axis data (FIG. 9A) as the quiet line in the center of the graph. The corresponding driving to the remote location and the return drive show as relatively higher vibrations. The relatively uniform temperature rise as the data logger sat in a parked car is also shown in FIG. 9B.

The test showed that data logger 200 is capable of recording temperature, humidity and vibration changes as they occur. This data is extremely important to know because temperature, humidity and vibration could significantly effect the growth of protein crystals inside micro-well plates.

Size Variations of Data Logger

Although it was stated above in reference to FIG. 2 that data logger 200 has approximately the same dimensions as a prior art 96-well micro-well plate, it is also possible to make a data logger that has dimensions that are substantially different than that of 96-well micro-well plate 100. For example, in the above preferred embodiments, it is primarily useful to have data logger 200 at approximately the same dimensions as a prior art 96-well micro-well plate 100 when both data logger 200 and micro-well plate 100 are being handled robotically by the same robot. For example, in the scenarios presented in reference to FIGS. 10 and 12 (i.e., utilization during transport between locations and utilization during incubation), data logger 200 can have a variety of dimensions and it does not have to match the dimensions of 96-well micro-plate 100.

Also, although the above embodiments described data logger 200 having approximately the same dimensions as a prior art 96-well micro-well plate 100, it is possible that a 96-well micro-plate will have other length, width and height dimensions than those described. In that event, it would be preferable to have data logger 200 match the dimensions of the 96-well micro-well plate to allow for utilization with the same robotic handling device, as described in reference to FIG. 11.

Also, of course, it is possible to utilize data logger 200 in conjunction with a variety of micro-well plates other than a 96-well micro-well plate. For example, it could be utilized with a 24, 48, 96, 384 or 1536-well micro-well plate. To allow for utilization with a robotic handling device as described in reference to FIG. 11, it would be preferable to manufacture data logger 200 so that it has approximately the same exterior dimensions as the micro-well plate that is being robotically handled.

Figure 3:
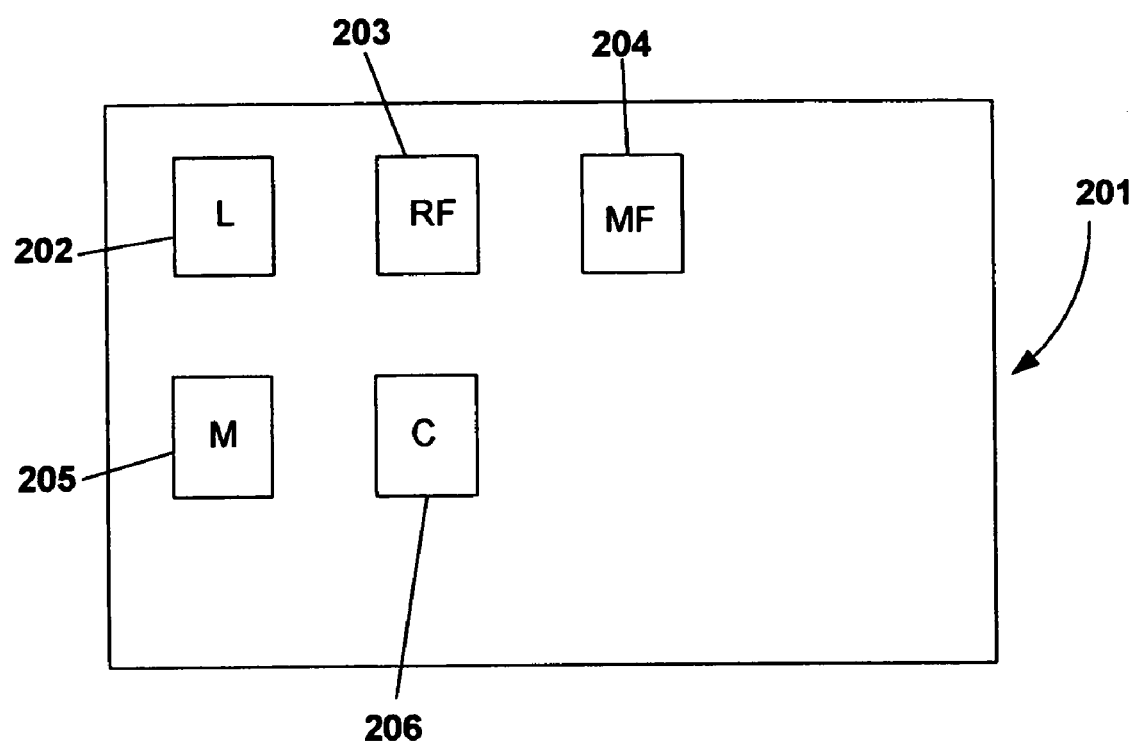
FIG. 3 shows another preferred data logger.

Although the above-preferred embodiments have been described with specificity, persons skilled in this art will recognize that many changes to the specific embodiments disclosed above could be made without departing from the spirit of the invention. For example, although the above preferred embodiments do not show any other sensors except humidity, temperature, and acceleration, other sensors where needed may be incorporated into the present invention without undo work. FIG. 3 shows data logger 201 having light level sensor 202 for experiments that are dependent of light level, radio frequency sensor 203 for experiments that could be effected by radio frequencies, magnetic field sensor 204 for experiments that could be effected by a magnetic field, microphone sensor 205 for experiments that could be effected by sound, and digital camera 206 to record images of the area surrounding the data logger. Also, although it was stated in the above preferred embodiments that data logger 200 is used to monitor environmental conditions effecting the growth of protein crystals in micro-well plates, there are other types of experiments that could be conducted in robotically handled micro-well plates where it is important to monitor environmental conditions. For example, it would be useful to utilize data logger 200 to monitor environmental conditions effecting micro-well plates in which the experiment was to quantify the mixing accelerations when the micro-well plate containing live culture and a growth medium is placed on standard micro-well plate mixer/orbital shakers. Along with the temperature, the degree of mixing can significantly affect cell growth in the culture. Using the data logger to measure temperature and acceleration would help ensure reproducible results. Therefore, the attached claims and their legal equivalents should determine the scope of the invention.

What is claimed is:

1. An environmental data recorder for recording environmental factors acting on a plurality of micro-well plates defining micro-well plate exterior dimensions, said environmental data recorder comprising:
   A) at least one sensor for sensing environmental factors,
   B) a microcontroller programmed to receive and process inputs from said at least one sensor, and
   C) a recorder housing unit for housing said at least one sensor and said microcontroller, wherein said recorder housing unit comprises exterior dimensions approximately equal to said micro-well plate exterior dimensions, permitting said environmental data recorder to be handled by a robotic device as if it were a micro-well plate.

2. The environmental data recorder as in claim 1, wherein said at least one sensor is a temperature sensor, a humidity sensor and at least one accelerometer.

3. The environmental data recorder as in claim 1, further comprising a battery for providing power to said microcontroller.

4. The environmental data recorder as in claim 3, further comprising a battery charging circuit for charging said battery.

5. The environmental data recorder as in claim 2, further comprising computer memory, wherein said microcontroller is programmed to calculate vibration based on said inputs from said accelerometer, wherein said microcontroller is programmed to record values for temperature, humidity and vibration in said computer memory.

6. The environmental data recorder as in claim 1, wherein said environmental recorder is connected to a remote computer for data storage of said inputs received from said at least one sensor.

7. The environmental data recorder as in claim 1, wherein said inputs are received at said microcontroller at programmed time intervals.

8. The environmental data recorder as in claim 1, wherein said inputs are received at said microcontroller when said at least one sensor senses a programmed threshold value.

9. The environmental data recorder as in claim 7, wherein said inputs are transmitted to said remote computer continuously.

10. The environmental data recorder as in claim 1, further comprising at least two status lights.

11. An environmental data recorder for recording environmental factors acting on a plurality of micro-well plates defining micro-well plate exterior dimensions, said environmental data recorder comprising:
    A) at least one sensor means for sensing environmental factors,
    B) a microcontroller means programmed to receive and process inputs from said at least one sensor means, and
    C) a recorder housing means for housing said at least one sensor means and said microcontroller means, wherein said recorder housing means comprises exterior dimensions approximately equal to said micro-well plate exterior dimensions, permitting said environmental data recorder to be handled by a robotic device as if it were a micro-well plate.

12. The environmental data recorder as in claim 11, wherein said at least one sensor means is a temperature sensor, a humidity sensor and at least one accelerometer.

13. The environmental data recorder as in claim 11, further comprising a battery means for providing power to said microcontroller means.

14. The environmental data recorder as in claim 13, further comprising a battery charging circuit for charging said battery means.

15. The environmental data recorder as in claim 12, further comprising computer memory, wherein said microcontroller means is programmed to calculate vibration based on said inputs from said accelerometer, wherein said microcontroller means is programmed to record values for temperature, humidity and vibration in said computer memory.

16. The environmental data recorder as in claim 11, wherein said environmental data recorder is connected to a remote computer means for data storage of said inputs received from said at least one sensor means.

17. The environmental data recorder as in claim 11, wherein said inputs are received at said microcontroller means at programmed time intervals.

18. The environmental data recorder as in claim 11, wherein said inputs are received at said microcontroller means when said at least one sensor senses a programmed threshold value.

19. The environmental data recorder as in claim 17, wherein said inputs are transmitted to said remote computer means continuously.

20. The environmental data recorder as in claim 11, further comprising at least two status lights.

21. A method for recording environmental factors acting on a plurality of micro-well plates, each micro-well plate defining micro-well plate exterior dimensions, wherein said method comprises the steps of:
   A) placing an environmental data recorder is close proximity to said at least one micro-well plate, said environmental data recorder comprising:
      (1) at least one sensor for sensing environmental factors,
      (2) a microcontroller programmed to receive and process inputs from said at least one sensor, and
      (3) a recorder housing unit for housing said at least one sensor and said microcontroller, wherein said recorder housing unit comprises exterior dimensions approximately equal to said micro-well plate exterior dimensions,
   B) handling said at least one micro-well plate and said environmental data recorder with at least one robotic device,
   C) receiving at said microcontroller said inputs from said at least one sensor, and
   D) processing at said microcontroller said inputs from said at least one sensor.

22. The method as in claim 21, wherein said at least one sensor is a temperature sensor, a humidity sensor and at least one accelerometer.

23. The method as in claim 21, further comprising a battery for providing power to said microcontroller.

24. The method as in claim 23, further comprising a battery charging circuit for charging said battery.

25. The method as in claim 22, further comprising computer memory, wherein said microcontroller is programmed to calculate vibration based on said inputs from said accelerometer, wherein said microcontroller is programmed to record values for temperature, humidity and vibration in said computer memory.

26. The method as in claim 21, wherein said environmental recorder is connected to a remote computer for data storage of said inputs received from said at least one sensor.

27. The method as in claim 21, wherein said inputs are received at said microcontroller at programmed time intervals.

28. The method as in claim 21, wherein said inputs are received at said microcontroller when said at least one sensor senses a programmed threshold value.

29. The method as in claim 27, wherein said inputs are transmitted to said remote computer continuously.

30. The method as in claim 21, further comprising at least two status lights.

31. The environmental data recorder as in claim 1, wherein said plurality of micro-well plates defining micro-well plate exterior dimensions is a plurality of standard size micro-well plates defining standard micro-well plate exterior dimensions.

32. The environmental data recorder as in claim 11, wherein said plurality of micro-well plates defining micro-well plate exterior dimensions is a plurality of standard size micro-well plates defining standard micro-well plate exterior dimensions.

33. The method as in claim 21, wherein said plurality of micro-well plates, each micro-well plate defining micro-well plate exterior dimensions is a plurality of standard size micro-well plates, each micro-well plate defining standard micro-well plate exterior dimensions.

* * * * *